United States Patent Office 3,304,337
Patented Feb. 14, 1967

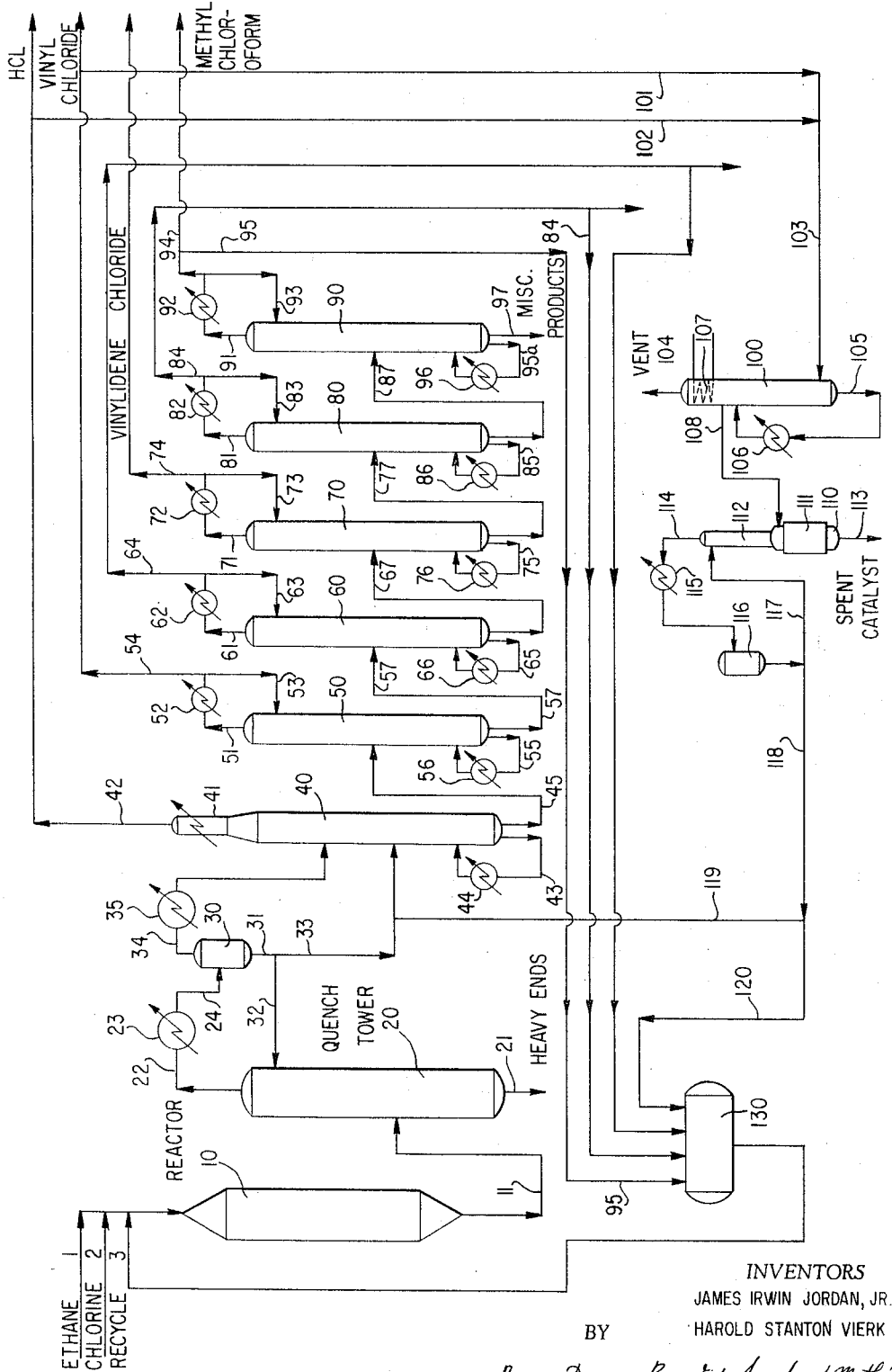

3,304,337
ETHANE CHLORINATION
James Irwin Jordan, Jr., and Harold Stanton Vierk, Wichita, Kans., assignors to Frontier Chemical Company, division of Vulcan Materials Company, Wichita, Kans., a corporation of New Jersey
Filed Aug. 22, 1962, Ser. No. 218,773
13 Claims. (Cl. 260—662)

This invention relates to a process for the chlorination of ethane at elevated temperature under conditions such that desirable yields of vinylidene chloride, vinyl chloride and 1,1,1-trichloroethane are obtained. More particularly it relates to a process wherein ethane and chlorine gas are fed to the chlorination reaction in admixture with substantial amounts of ethyl chloride and 1,1-dichloroethane. A preferred embodiment of the invention relates to such a process wherein the required amount of ethyl chloride is produced in the process and recycled without requiring any extraneous source of ethyl chloride. In still another preferred embodiment it relates to a process wherein particularly high yields of vinylidene chloride are obtained while 1,1-dichloroethane is consumed, but the process nevertheless is made self-sufficient with respect to its requirements for 1,1-dichloroethane by suitable production of the latter from at least a portion of the vinyl chloride and hydrogen chloride present in the chlorination product.

Vinyl chloride and vinylidene chloride find extensive use as monomers in the manufacture of important classes of plastics while 1,1,1-trichloroethane, also known as methyl chloroform, is in demand as a solvent useful in degreasing metals and in other commercial operations. Consequently there has been a real need to provide an economical and flexible process capable of producing the aforementioned chlorinated hydrocarbons in good yields.

Vinyl chloride and vinylidene chloride have been heretofore made by a variety of processes. All of these, however, have had various major disadvantages in terms of poor selectivity to desired products, a substantial explosion hazard at high chlorine/hydrocarbon feed ratios, or in terms of poor plant capacity or complicated product recovery when attempts were made to improve the selectivity and safety of the operation by use of large volumes of "inert" diluents such as steam or hydrogen chloride, the latter being obtained as a by-product in the process. Moreover, the prior art has indicated the necessity of using such large quantities of HCl as diluent to assure adequate process control that economical product recovery has been all but impossible. The use of steam as diluent has also proved undesirable in that it causes excessive corrosion of equipment and decomposition of organic products upon condensation.

In addition, such prior processes generally have required reaction temperatures of about 850° F. and higher. They have resulted in the production of no or only minor amounts of methyl chloroform and in the production of substantial amounts of tars and other heavy ends which have caused objectionable plugging and fouling of equipment as well as yield losses. Heretofore, to produce substantial amounts of methyl chloroform, it has been generally necessary to produce it in a separate chlorination operation employing 1,1-dichloroethane as its principal feed stock. However, this process is rather expensive to operate and notorious for its tendency to form excessive amounts of carbon. When this tendency is repressed by the use of diluents, plant capacity suffers.

It is, therefore, an object of this invention to provide a safe and efficient process capable of producing good yields of vinylidene chloride, vinyl chloride and methyl chloroform with a minimum number of by-products in a single conversion step using ethane and free chlorine gas at relatively high chlorine/ethane ratios as the principal feed components without the need for any extraneous inert diluents. Another object is to provide an ethane chlorination process wherein ethyl chloride is formed and recycled to extinction while usefully modifying the chlorination reaction. A further object is to provide an ethane chlorination process requiring a minimum of refrigeration and compression during product recovery. Still another object is to provide a process for making a high yield of vinylidene chloride in a principal chlorination step while converting in an auxiliary step a portion of the reaction products to provide 1,1-dichloroethane for use in the chlorination step. These and other objects, as well as the nature, scope, advantages and suitable modes of operation of this invention will become apparent from the following description, illustrative examples and appended claims.

It has now been discovered that the aforementioned and other objects can be advantageously attained by non-catalytically chlorinating ethane or a normally gaseous ethane-rich hydrocarbon fraction at suitable conditions of temperature and pressure while modifying and moderating the reaction by employing a substantial amount of one or more of the reaction products, e.g., 1,1-dichloroethane, as a reaction diluent. The composition of this diluent is varied depending upon the product distribution desired. This will become apparent by the examples given. Reaction conditions have now been discovered in such a system such that vinyl chloride, vinylidene chloride, and methyl chloroform will represent from about 70 to 95 mole percent of the total chlorinated hydrocarbons.

The production of methyl chloroform is favored by the recycle of ethyl chloride and 1,1-dichloroethane. For this purpose, conditions can be controlled such that the molar quantity of 1,1-dichloroethane consumed by the reaction is equal to the moles of vinyl chloride produced. The latter can then be converted to more 1,1-dichloroethane by reacting it with hydrogen chloride in liquid phase using an iron chloride catalyst or in any other manner that is well known to the art. For instance, 1,1-dichloroethane can be made by introducing vinyl chloride and hydrogen chloride in essentially stoichiometric quantities into a liquid reservoir of 1,1-dichloroethane that contains about 0.1 to 5% by weight, e.g., 0.5%, of ferric chloride ($FeCl_3$). The liquid is conveniently circulated through a heat exchanger to maintain the temperature of the reservoir between 100° and 150° F. by removing the exothermic heat of reaction. It has been found advantageous to operate this reaction at a pressure between 40 and 50 p.s.i.g. thus reducing the loss of product in the small vent flow containing mostly unreacted HCl. The reaction vessel is provided with means of withdrawing the 1,1-dichloroethane produced as a liquid into a flash distillation system or other convenient system that will separate the product from dissolved catalyst.

In addition to the 1,1-dichloroethane recycle, it is desirable to have a total recycle of ethyl chloride. Thus the net production of vinyl chloride, ethyl chloride, and 1,1-dichloroethane can be held essentially to nil. The following examples and description, together with the attached drawing, will provide further illustrative details of this invention. In all examples the feed materials are passed through the reaction chamber at a rate designed to provide the vaporized reaction mixture with an average residence time of about 15 seconds at reaction temperature.

*Example 1*

A feed mixture of 0.441 mole of ethane, 0.105 mole of ethyl chloride, 0.669 mole of 1,1-dichloroethane and one mole of free chlorine was injected into a continuous reactor that was being maintained at a pressure of 70 p.s.i.g.

and an average temperature of 781° F. with the maximum temperature at 800° F. At these conditions, it was found that 0.112 mole of ethyl chloride was produced giving a net ethyl chloride production of .007 mole. Also it was found that 0.175 mole of 1,1-dichloroethane were consumed while 0.175 mole of vinyl chloride were being produced. All of the latter was then used to react with HCl in an extraneous reactor to replace the 1,1-dichloroethane consumed, thus resulting in an overall net production of vinyl chloride of zero. Table I shows the complete effluent composition:

TABLE I

|  | Moles per Mole Cl₂ Fed ||| Production, mole percent |
|---|---|---|---|---|
|  | Feed | Effluent | Net Produced |  |
| Vinyl Chloride | | .175 | 0 | |
| Ethyl Chloride | .105 | .112 | .007 | 2.4 |
| Vinylidene Chloride | | .062 | .062 | 21.6 |
| 1,1-dichloroethane | .669 | .494 | 0 | |
| 1,1,1-trichloroethane | | .189 | .189 | 65.9 |
| 1,2-dichloroethane | | .010 | .010 | 3.5 |
| 1,1,2-trichloroethane | | .012 | .012 | 4.2 |
| Miscellaneous | | .007 | .007 | 2.4 |

These data show that the present invention can be readily used to make a product containing over 60 mole percent 1,1,1-trichloroethane, over 20 mole percent vinylidene chloride and less than 15 mole percent of the less desirable by-products.

Example 2

The production of vinylidene chloride can be significantly increased by including methyl chloroform (1,1,1-trichloroethane) in the recycle. Methyl chloroform will decompose under the influence of heat to produce vinylidene chloride and hydrogen chloride. Thus the exothermic heat of reaction given off by the chlorination reactions can be utilized in the present invention to decompose methyl chloroform to obtain still higher yields of vinylidene chloride. At the same time 1,1-dichloroethane is recycled to provide by its subsequent chlorination a source of methyl chloroform. The following data serve to illustrate the use of methyl chloroform recycle.

A mixture of 0.411 mole of ethane, 0.090 mole of ethyl chloride, 0.558 mole of 1,1-dichloroethane, 0.102 mole of methyl chloroform, 0.012 mole of miscellaneous compounds and one mole of free chlorine as shown in Table II was introduced into the reactor that was being maintained at a pressure of 70 p.s.i.g., and an average temperature of 739° F. with a maximum temperature of 750° F. It was found that 0.159 mole of 1,1-dichloroethane was consumed while 0.183 mole of vinyl chloride was being produced. Reacting 0.159 mole of vinyl chloride with HCl in a separate reaction to replace the 1,1-dichloroethane consumed, the net production of vinyl chloride is reduced by 0.159 mole.

Table II below summarizes the results of the run, showing that a product containing more than 50 mole percent vinylidene chloride and 20 mole percent or more of methyl chloroform can thus be obtained.

TABLE II

|  | Moles per Mole Cl₂ Fed ||| Production, mole percent |
|---|---|---|---|---|
|  | Feed | Effluent | Net Produced |  |
| Vinyl Chloride | .003 | .183 | .021 | 7.3 |
| Ethyl Chloride | .090 | .098 | .008 | 2.8 |
| Vinylidene Chloride | | .170 | .170 | 59.0 |
| 1,2-dichloroethylene | .006 | .010 | .004 | 1.4 |
| 1,1-dichloroethane | .558 | .399 | 0 | |
| 1,1,1-trichloroethane | .102 | .160 | .058 | 20.1 |
| 1,2-dichloroethane | .002 | .014 | .012 | 4.2 |
| 1,1,2-trichloroethane | | .013 | .013 | 4.5 |
| Miscellaneous | .001 | .003 | .002 | 0.7 |

Example 3

When vinylidene chloride is not particularly wanted, conditions can be set to balance the production of 1,1-dichloroethane without utilizing vinyl chloride. Thus the entire production of vinyl chloride may be withdrawn as product. The following data serve to illustrate this system.

A mixture of 0.599 mole of ethane, 0.313 mole of ethyl chloride, 0.582 mole of 1,1-dichloroethane and one mole of free chlorine was injected into the reactor that was being maintained at a pressure of 70 p.s.i.g., and an average temperature of 780° F. with the maximum temperature at 800° F. Table III shows the results obtained.

TABLE III

|  | Moles per Mole Cl₂ Fed ||| Production, mole percent |
|---|---|---|---|---|
|  | Feed | Effluent | Net Produced |  |
| Vinyl Chloride | | 0.120 | 0.120 | 38.7 |
| Ethyl Chloride | 0.313 | 0.315 | 0.002 | 0.6 |
| Vinylidene Chloride | | 0.023 | 0.023 | 7.3 |
| 1,2-dichloroethylenes | | 0.001 | 0.001 | 0.3 |
| 1,1-dichloroethane | 0.582 | 0.606 | 0.024 | 7.6 |
| 1,1,1-trichloroethane | | 0.124 | 0.124 | 39.9 |
| 1,2-dichloroethane | | 0.013 | 0.013 | 4.2 |
| 1,1,2-trichloroethane | | 0.004 | 0.004 | 1.4 |
| Miscellaneous | | 0.000 | 0.000 | 0.0 |

Example 4

In the course of conducting the work leading to the present invention, it has been found that the net production of 1,2-dichloroethane and 1,1,2-trichloroethane can be essentially eliminated by including said compounds in the recycle to the reaction without any appreciable adverse effects. The following data are given to illustrate this finding.

A mixture of 0.433 mole of ethane, 0.083 mole of ethyl chloride, 0.490 mole of 1,1-dichloroethane, 0.157 mole of methyl chloroform, 0.004 mole of 1,2-dichloroethane, 0.027 mole of 1,1,2-trichloroethane and one mole of free chlorine was injected into the reactor being maintained at a pressure of 64 p.s.i.g. and an average temperature of 748° F. with a maximum temperature of 775° F. Table IV shows the results.

TABLE IV

|  | Moles per Mole Cl₂ Fed ||| Consumed, mole percent | Production, mol percent |
|---|---|---|---|---|---|
|  | Feed | Effluent | Net Production |  |  |
| Vinyl Chloride | .008 | .167 | .159 | | 37.6 |
| Ethyl Chloride | .083 | .098 | .015 | | 3.5 |
| Vinylidene Chloride | | .124 | .124 | | 29.3 |
| 1,2-dichloroethylenes | | .012 | .012 | | 2.8 |
| 1,1-dichloroethane | .490 | .382 | | 22.0 | |
| 1,1,1-trichloroethane | .157 | .260 | .103 | | 24.4 |
| 1,2-dichloroethane | .004 | .011 | .007 | | 1.7 |
| 1,1,2-trichloroethane | .027 | .023 | | 14.8 | |
| Miscellaneous | | .003 | .003 | | .7 |

Example 5

This system can also be operated using methyl chloroform or a mixture of methyl chloroform and ethyl chloride as a recycle. The following data illustrate the use of this system.

A mixture of 0.582 mole of ethane, 0.110 mole of ethyl chloride, 0.603 mole of methyl chloroform, .008 mole of 1,2-dichloroethane and one mole of free chlorine was injected into the reactor which was being maintained at a pressure of 70 p.s.i.g. and an average temperature of 779° F. with a maximum reactor temperature of 800° F. Table V presents the results of this run. In this manner it is possible to produce 1,1-dichloroethane in a high yield in preference to other products.

TABLE V

| | Moles per Mole Cl₂ Fed | | | Consumed, mole percent | Production, mole percent |
|---|---|---|---|---|---|
| | Feed | Effluent | Net Production | | |
| Vinyl Chloride | | .089 | .089 | | 22.1 |
| Ethyl Chloride | .118 | .150 | .032 | | 8.0 |
| Vinylidene Chloride | | .117 | .117 | | 29.1 |
| 1,2-dichloroethylenes | | .002 | .002 | | 0.5 |
| 1,1-dichloroethane | | .156 | .156 | | 38.8 |
| 1,1,1-trichloroethane | .603 | .555 | | 8.0 | |
| 1,2-dichloroethane | .008 | .011 | .003 | | 0.7 |
| 1,1,2-trichloroethane | | .003 | .003 | | 0.7 |
| Miscellaneous | | .000 | .000 | | 0.0 |

Example 6

A mixture of 0.327 mole of ethane, 0.142 mole of ethyl chloride, 0.502 mole of methyl chloroform, 0.006 mole of 1,2-dichloroethane and one mole of free chlorine was injected into the reactor which was being maintained at a pressure of 73 p.s.i.g. and an average temperature of 758° F. with a maximum temperature of 775° F. Table VI summarizes the results of the run.

By comparison with the results of Example 5, it can be seen that the higher chlorine/ethane ratio or higher dilution of the ethane feed with chlorinated ethanes employed in Example 6 leads to an increased production of vinylidene chloride in preference to production of 1,1-dichloroethane.

TABLE VI

| | Moles per Mole Cl₂ Fed | | | Consumed, mole percent | Production, mole percent |
|---|---|---|---|---|---|
| | Feed | Effluent | Net Production | | |
| Vinyl Chloride | | .149 | .149 | | 26.4 |
| Ethyl Chloride | .142 | .007 | | 95.0 | |
| Vinylidene Chloride | | .334 | .334 | | 59.2 |
| 1,2-dichloroethylenes | | .017 | .017 | | 3.0 |
| 1,1-dichloroethane | | .032 | .032 | | 5.7 |
| 1,1,1-trichloroethane | .502 | .304 | | 39.4 | |
| 1,2-dichloroethane | .006 | .001 | | 83.3 | |
| 1,1,2-trichloroethane | | .005 | .005 | | 0.9 |
| Miscellaneous | | .027 | .027 | | 4.8 |

By supplementing the recycle with 1,1-dichloroethane, the conditions can be obtained that will maintain a balance on the methyl chloroform providing a net production of essentially zero. The following example illustrates this point.

Example 7

A mixture containing 0.485 mole of ethane, 0.113 mole of ethyl chloride, 0.274 mole of 1,1-dichloroethane, 0.405 mole of methyl chloroform, 0.002 mole of 1,2-dichloroethylenes, 0.005 mole of 1,2-dichloroethane and one mole of free chlorine was injected into the reactor which was being maintained at a pressure of 71 p.s.i.g. and an average temperature of 776° F. with a maximum temperature of 800° F. Table VII presents the results of the run.

TABLE VII

| | Moles per Mole Cl₂ Fed | | | Consumed, mole percent | Production, mole percent |
|---|---|---|---|---|---|
| | Feed | Effluent | Net Production | | |
| Vinyl Chloride | | .126 | .126 | | 40.5 |
| Ethyl Chloride | .113 | .128 | .015 | | 4.8 |
| Vinylidene Chloride | | .135 | .135 | | 43.4 |
| 1,2-dichloroethylenes | .002 | .005 | .003 | | 1.0 |
| 1,1-dichloroethane | .274 | .290 | .016 | | 5.1 |
| 1,1,1-trichloroethane | .405 | .396 | | 2.2 | |
| 1,2-dichloroethane | .005 | .012 | .007 | | 2.3 |
| 1,1,2-trichloroethane | | .007 | .007 | | 2.3 |
| Miscellaneous | | .002 | .002 | | 0.6 |

It has thus been discovered that good yields of vinyl chloride, vinylidene chloride, and methyl chloroform can be obtained from the chlorination of ethane by recycling some of the reaction products, particularly the saturated chlorinated hydrocarbons such as ethyl chloride, 1,1-dichloroethane and methyl chloroform. The recycling of these saturated compounds has been found particularly advantageous because, in addition to their diluent effect as such, they help to moderate the highly exothermic chlorination reaction by virtue of the fact that they tend to undergo dehydrochlorination which is distinctly endothermic. The present invention permits controlling the distribution of these desired products within wide limits by varying the composition of the recycle material and by controlling the chlorine to ethane feed ratio.

The essential conditions for securing the desired results are: (1) a reaction temperature above 650° F. and below 820° F., preferably between 700° and 800° F., (2) a reaction pressure between about 10 p.s.i.g. and 100 p.s.i.g., preferably between 40 and 80 p.s.i.g.; (3) an average residence time of the gases in the reaction zone of at least 5 seconds, preferably between 10 and 15 seconds; (4) a molar ratio of free chlorine to ethane in the feed between about 1.5/1 and 3/1, preferably between 1.8 and 2.5/1; and (5) the use of a suitable amount of a diluent which comprises a chlorinated alkane capable of dehydrochlorination under the aforementioned reaction conditions and thereby capable of controlling the reaction temperature at the desired level, i.e., a chlorinated ethane containing 1 to 3 chlorine atoms per molecule. Accordingly, the feed also characteristically contains a molar ratio of 1,1-dichloroethane to free chlorine between 0 and about 0.7/1, preferably between 0.3/1 and 0.65/1; and a molar ratio of ethyl chloride to free chlorine between 0 and about 0.4/1, preferably between about 0.05/1 and 0.4/1, and still more particularly at the ratio resulting in a recycle of the total ethyl chloride coming from the reaction zone. When a high yield of vinylidene chloride is desired, the feed should also preferably contain a molar ratio of 1,1,1-trichloroethane (methyl chloroform) to free chlorine of between about 0.1/1 and about 0.6/1, preferably between 0.1/1 and 0.2/1. The optimum combination of the several conditions aforesaid will vary depending on the relative proportions of the principal products desired as indicated by the illustrative examples. Obviously, optimum operating conditions can be empirically determined for each particular case.

The ethane used as feed is preferably free from other hydrocarbons though a C₂ cut containing up to about 20% ethylene in admixture with ethane can be used.

The process of the invention operates without carbon formation and without explosion at the pressures and chlorine/ethane ratios stated. This is quite unexpected as the art has frequently stressed the explosion hazards inherent in chlorinating ethane or the like at high Cl₂/hydrocarbon ratios. Operation of the process under pressure has the advantage of greatly reducing the size of the reactor system for any given capacity and of permitting product recovery at higher levels of refrigeration temperature without recompression of the reactor effluent gases. Recompression of these gases is very undesirable because of initial investment costs and cost for maintenance of compressors handling a very corrosive gas.

Another important advantage of the present process is its ability to confine the product distribution from the chlorination to a relatively small number of the total number of possible products. By contrast, the prior art has been generally faced with the inordinate difficulties of separating pure commercial products from the complex product mixtures normally obtained in hydrocarbon chlorinations.

It will be understood that, unlike the previously known use of inert diluents such as gaseous HCl, steam or fully chlorinated compounds such as carbon tetrachloride in the chlorination of ethane, the present invention employs ethyl chloride, 1,1-dichloroethane and methyl chloroform, i.e., only partially chlorinated hydrocarbons, for their dual function of both moderating the reaction by their cooling effect and simultaneously serving as additional chlorination or dehydrochlorination feed, as the case may be. The total quantity of recycle is used to control the reaction at the desired temperature. In a preferred operation, the process is balanced with respect to ethyl chloride production and conversion in that ethyl chloride is totally recycled; the quantity of 1,1-dichloroethane is then set to obtain the desired temperature. In the case of maximum vinylidene chloride and methyl chloroform production, the quantity of 1,1-dichloroethane required to control the temperature is such that a net consumption of this compound is obtained. The process is then made self-sufficient with respect to 1,1-dichloroethane by making up the required amount of 1,1-dichloroethane by conversion of at least a portion of the hydrogen chloride and vinyl chloride produced in the process. In the preferred operation for maximum vinylidene chloride and methyl chloroform, the total vinyl chloride produced is used to make up the 1,1-dichloroethane consumed by the reaction.

A typical embodiment of the present non-catalytic ethane chlorination process will now be described with reference to the figure of the attached drawing. The drawing contains a flow sheet showing suitable equipment used and the movement of materials therethrough. The feed materials, namely, ethane, chlorine, and a recycle stream comprising ethyl chloride, 1,1-dichloroethane, and 1,1,1-trichloroethane, are introduced into reactor 10 which is at a pressure of about 70 p.s.i.g. through lines 1, 2, and 3, respectivelly. The reactor is heated initially by any suitable means such as injecting ethane preheated to about 800° F. After the reactor temperature reaches 650° F. the desired feed rates are established with elimination of all preheat. The reactor chamber 10 is constructed of a suitable alloy such as Monel, nickel, Inconel, etc. and externally covered with insulation to minimize heat losses. In general, the reaction system is thermally self-sustaining. No heat needs to be added to or subtracted from the reactor other than that carried in and out by the feed components and the product effluent. The volume of reactor 10 is so proportioned with respect to the design feed rate that a residence time of about 5 to 30 seconds is provided for the gaseous reaction mixture at reaction temperature.

The hot exit gases from reactor 10 pass through pipe 11 to tower 20. Here the small amount of heavy ends produced, such as tetrachloroethane and hexachloroethane, are purged via line 21 while lighter products are removed overhead and introduced into separator drum 30 via lines 22 and 24 after cooling to about 100° F. in water cooler 23. A portion of the liquid condensate is returned as reflux to tower 20 via lines 31 and 32. The excess condensate is passed through line 33 to tower 40. The vapors are next passed to refrigeration unit 35 via line 34. After cooling to about 0° F. so as to condense substantially all vinyl chloride present, the vapor-liquid mixture is led through line 36 to tower 40 for removal of HCl. The off-gases from the top of column 40 pass through a refrigerated reflux head 41 maintained at a temperature of about −55° F. and a pressure of about 65 p.s.i.g., i.e., a pressure a few pounds lower than the pressure in reactor 10. The overhead gas, composed mainly of HCl and ethylene, is finally withdrawn from the system via ilne 42. The liquid condensate containing a mixture of the desired chlorinated hydrocarbon products is withdrawn as a bottoms stream from stripping column 40 via line 45, a portion of the bottoms stream being also circulated through line 43 and reboiler 44. The withdrawn liquid bottoms stream is passed to a distillation tower 50 for removal of the vinyl chloride fraction.

The tower overhead containing essentially pure vinyl chloride passes through condenser 52 via line 51. A portion of the condensed liquid is returned to the tower as reflux via lines 53. The vinyl chloride product is withdrawn via line 54. Circulation is maintained on the tower bottoms through a boiler 56 via line 55 to provide vapor boil-up. The remaining portion of chlorinated organic product is removed from tower 50 via line 57 to the ethyl chloride fractionation tower 60. The tower overhead vapor containing essentially pure ethyl chloride passes through condenser 62 via line 61. A portion of the liquid condensate is returned to the tower as reflux via line 63. The ethyl chloride product is withdrawn via line 64 to the recycle tank 130 where it is mixed into the total recycle to the reactor. Circulation is maintained on the bottoms of tower 60 through reboiler 66 via line 65 to provide vapor boil-up. The remaining organic product is withdrawn via line 67 to the vinylidene chloride fractionation tower 70. Here the tower overhead vapor containing essentially pure vinylidene chloride passes through condenser 72 via line 71. A portion of the liquid condensate is returned to the tower as reflux via line 73. The product is withdrawn via line 74 to product storage. Circulation is maintained on the tower bottoms through reboiler 76 via line 75 to provide vapor boil-up.

The remaining product is withdrawn via line 77 to the 1,1-dichloroethane fractionation tower 80. The tower overhead vapor containing essentially pure 1,1-dichloroethane with small amounts of cis- and trans-dichloroethylene passes through condenser 82 via line 81. A portion of the condensate is returned to the tower as reflux via line 83. The remaining product is withdrawn via line 84 to the recycle tank 130 where it is mixed into the total recycle to the reactor. Circulation is maintained on the bottom of tower 80 through reboiler 86 via line 85 to provide vapor boil-up. The remaining chlorinated organic product is withdrawn from the bottom via line 87 to the methyl chloroform fractionation tower 90. The tower overhead vapor containing essentially pure methyl chloroform is passed through condenser 92 via line 91. A portion of the liquid condensate is returned to the tower as reflux via line 93. The remaining liquid is withdrawn as product via line 94. When it is desirable to recycle to the reactor a portion or all of the methyl chloroform, the tower product passes to recycle tank 130 via line 95. Circulation is maintained in the bottom of tower 90 through reboiler 96 via line 95a. The remaining bottoms product is withdrawn via line 97. If there is no alternate use for these bottoms, it may become desirable to subject this mixture to further fractionation to obtain a 1,2-dichloroethane-1,1,2-trichloroethane fraction. This product can be returned to tank 130 for recycle to the reactor.

Where the process is operated under conditions such that there is a net consumption of 1,1-dichloroethane, the required make-up amount of 1,1-dichloroethane required for feeding the chlorination reaction can be readily obtained by reacting a portion of the HCl with a portion of the vinyl chloride product. For this purpose, HCl and vinyl chloride in approximately equal molar amounts may be passed via lines 101, 102, and 103 to reactor 100 where they are sparged into a liquid reservoir of 1,1-dichloroethane containing at least 0.1 weight percent, e.g., 0.5 weight percent, of ferric chloride catalyst. The 1,1-dichloroethane catalyst mixture is circulated through exchanger 106 via line 105 to remove the heat of reaction maintaining the reactor between 100° and 150° F. and a pressure of between about 40 and 50 p.s.i.g. Circulation also provides means of keeping the catalyst thoroughly dispersed in the reactor. The reaction proceeds rapidly with substantially quantitative formation 1,1-dichloroethane. As 1,1-dichloroethane forms, it is withdrawn from the reactor via line 108. The inert gases in the HCl such as ethane will pass through the reactor. These inert materials along with a small portion of unreacted HCl pass over cooling coil 107 to reduce the amount of 1,1-dichloroethane in the vapor phase to a negligible quantity. The condensed material falls back into the reactor while the remaining vapor passes out of the system via line 104 to maintain the reactor pressure between 40 and 50 p.s.i.g. The 1,1-dichloroethane product withdrawn through line 108 passes into a flash pot 110 that is supplied with heating means such as a steam jacket 111. The product is vaporized passing up through a small packed or trayed tower 112 leaving behind in the pot the ferric chloride catalyst that was carried from the reactor. The overhead vapor passes through condenser 115 via line 114 and into a liquid receiver 116. A portion of the liquid is returned to the tower as reflux via line 117. The 1,1-dichloroethane, containing small amounts of HCl, vinyl chloride, and ethyl chloride that may be formed in the reactor by the action of HCl on any ethylene present in the HCl feed to reactor 100, is preferably passed back to the HCl stripper 40 via lines 118 and 119 for purification or alternately it may be passed directly to recycle tank 130 via lines 118 and 120.

It has been further discovered that the ethane chlorination process described above can be modified in a certain manner so as to produce surprisingly high yields of 1,1-dichloroethane, and only small amounts of other products, when desired. To accomplish this, essentially the same reaction temperatures, pressures and residence times are employed as described earlier in column 6 hereof. However, unlike in the cases where products such as vinyl chloride, vinylidene chloride or methyl chloroform are principally sought after, the production of 1,1-dichloroethane requires a relatively low chlorine-ethane feed ratio, e.g., a ratio of between about 0.5 and 1.2, preferably between 0.7 and 0.9 mole of free chlorine per mole of ethane in the feed. Good tempearture control can be maintained by suitable minor variations in chlorine input.

In addition to ethane and chlorine, the feed in this case further contains ethyl chloride as diluent, preferably exclusive of other chlorinated hydrocarbons. The required ethyl chloride, or at least a major proportion thereof, is conveniently supplied by recycling all of the ethyl chloride formed in the process. In this manner, about 0.8 to 2 moles, preferably about 1.2 to 1.5 moles, of ethyl chloride is provided in the feed per mole of free chlorine. When operating as just indicated, a product containing 75 or 85 mole percent or more of 1,1-dichloroethane can be advantageously obtained, along with small amounts of a limited number of other useful products. For instance, a product containing 85 mole percent of 1,1-dichloroethane will typically also contain about 4 mole percent of vinyl chloride, about 2 mole percent of vinylidene chloride, about 6 mole percent of 1,1,1-trichloroethane and about 3 mole percent of 1,2-dichloroethane.

Runs exemplifying the production of 1,1-dichloroethane by direct chlorination of ethane according to this invention are summarized in Table VIII below. The reactor, accessory equipment and recovery procedures used were essentially the same as described earlier herein.

The data presented in Table VIII show that the process can be readily operated at ethane conversions in excess of 40 percent while obtaining a selectivity to 1,1-dichloroethane of about 85 mole percent. Moreover, the data show that conditions can be set such that the process will be in substantial balance on ethyl chloride, i.e., the process can be readily operated under conditions such that there is neither net production nor net consumption of ethyl chloride, the amount of ethyl chloride produced in the process being in substantial balance with the amount of ethyl chloride required as feed diluent.

TABLE VIII.—PRODUCTION OF 1,1-DICHLOROETHANE

| Run No. | 8 | 9 | 10 |
|---|---|---|---|
| Feed, moles: | | | |
| Ethane | 1.270 | 1.204 | 1.204 |
| Chlorine | 1.000 | 1.000 | 1.000 |
| Ethyl Chloride | 1.360 | 1.371 | 1.368 |
| Reactor Conditions: | | | |
| Pressure, p.s.i.g. | 64.0 | 64.0 | 64.0 |
| Maximum Temp., °F | 775 | 775 | 775 |
| Average Temp., °F | 765 | 764 | 764 |
| Retention Time, sec. | 14.1 | 14.3 | 14.3 |
| Reactor Effluent moles: | | | |
| Vinyl Chloride | 0.016 | 0.015 | 0.018 |
| Ethyl Chloride | 1.373 | 1.336 | 1.297 |
| Vinylidene Chloride | 0.001 | 0.006 | 0.006 |
| 1,1-dichloroethane | 0.318 | 0.335 | 0.327 |
| 1,1,1-trichloroethane | 0.016 | 0.025 | 0.025 |
| 1,2-dichloroethane | 0.010 | 0.011 | 0.011 |
| Net Production, Mole Percent of Net Chlorinated Products: | | | |
| Vinyl Chloride | 4.3 | 3.8 | 4.7 |
| Ethyl Chloride | 3.5 | | |
| Vinylidene Chloride | 0.2 | 1.5 | 1.6 |
| 1,1-dichloroethane | 85.0 | 85.5 | 84.5 |
| 1,1,1-trichloroethane | 4.3 | 6.4 | 6.4 |
| 1,2-dichloroethane | 2.7 | 2.8 | 2.8 |
| Net Consumption, Mole Percent of Feed: | | | |
| Ethane | 46.0 | 46.6 | 44.0 |
| Ethyl Chloride | | 2.6 | 5.2 |

It will be understood that the foregoing description has been presented principally for purposes of illustration rather than limitation and that numerous variations and modifications of the described invention are possible without departing from the spirit thereof or the scope of the appended claims.

We claim:
1. A process for chlorinating ethane to make a mixture of chlorinated hydrocarbons rich in methyl chloroform, vinyl chloride and vinylidene chloride, which comprises the steps of:
    passing into a reaction zone a mixture consisting essentially of ethane, chlorine, and a saturated chlorinated ethane containing 1 to 3 chlorine atoms per molecule, said saturated chlorinated ethane being in proportions sufficient (a) to absorb exothermic heat of reaction so as to thereby maintain the temperature in said zone within the range of about 650° F. to about 820° F., and (b) to modify the product distribution of said chlorinated hydrocarbons, said zone being maintained at a superatmospheric pressure of about 10 p.s.i.g. to about 100 p.s.i.g., the mole ratio of free chlorine to ethane being between about 1.5 and about 3,
    withdrawing the reaction mixture from said reaction zone,
    separating and recovering the desired chlorinated hydrocarbon reaction product,
    and recycling to the reaction zone at least a portion of the saturated chlorinated ethane contained therein to control the temperature and modify the product distribution.
2. A process according to claim 1 wherein essentially all ethyl chloride present in the reaction product is recycled to the reaction zone and the average residence time of the reaction mixture within the reaction zone is at least 5 seconds.
3. A process according to claim 2 wherein at least a portion of dichloroethane present in the reaction product is recycled to the reaction zone and wherein the mole ratio of free chlorine to ethane is from about 1.8 to about 2.5.
4. A process according to claim 2 wherein the reaction zone is maintained at a superatmospheric pressure of about 40 p.s.i.g. to about 80 p.s.i.g.
5. A process according to claim 1 wherein the temperature within the reaction zone is maintained within the range of about 700° F. to about 800° F.
6. A continuous process for converting ethane to a chlorinated hydrocarbon mixture rich in vinyl chloride, vinylidene chloride and methyl chloroform by chlorination of ethane which comprises
 (a) forming a feed mixture consisting essentially of ethane, chlorine, ethyl chloride, 1,1-dichloroethane, and methyl chloroform, said mixture being characterized (1) by a free chlorine to ethane mole ratio between 1.8 and 2.5, a 1,1-dichloroethane to free chlorine mole ratio between 0.3 and about 0.7, and an ethyl chloride to free chlorine mole ratio of 0.05/1 to about 0.4/1, and (2) by a chlorinated ethane content sufficient to thereby maintain a maximum chlorination temperature within the range between about 700° and about 800° F.;
 (b) passing said mixture in the absence of catalyst through a reaction zone maintained at a pressure between 40 and 80 p.s.i.g., whereby said mixture is reacted within the aforesaid temperature range;
 (c) withdrawing the resulting product mixture under pressure and fractionally distilling it in a product recovery zone to produce a vinyl chloride fraction, an ethyl chloride fraction, a vinylidene chloride fraction, a 1,1-dichloroethane fraction and a methyl chloroform fraction therefrom;
 (d) and recycling said 1,1-dichloroethane fraction and said ethyl chloride fraction to said reaction zone to supply the required amount of ethyl chloride and 1,1-dichloroethane therein.

7. A process according to claim 2 wherein methyl chloroform is recycled to the reaction zone to provide a feed mixture containing 0.1 to 0.6 mole methyl chloroform per mole of free chlorine.

8. A process according to claim 6 wherein substantially all of the ethyl chloride product fraction is recycled to the reaction zone.

9. A process according to claim 6 characterized by a net consumption of 1,1-dichloroethane and wherein hydrogen chloride and vinyl chloride separated from the product mixture are reacted to make up the amount of 1,1-dichloroethane consumed in the reaction, and the 1,1-dichloroethane thus produced is passed to the feed inlet of said reaction zone to supplement the 1,1-dichloroethane fraction recycled from the product recovery zone.

10. A process according to claim 6 wherein the ethane feed is essentially free from other hydrocarbons.

11. A process according to claim 6 wherein the ethane feed contains up to 20 mole percent ethylene.

12. A process for making 1,1-dichloroethane which comprises passing a feed consisting essentially of ethane, chlorine and ethyl chloride through a reaction zone at a temperature between about 650° and 820° F. and at superatmospheric pressure between about 10 p.s.i.g. and about 100 p.s.i.g., said feed containing about 0.5 to 1.2 moles of free chlorine per mole of ethane and about 0.8 to 2 moles of ethyl chloride per mole of free chlorine, said ethyl chloride being present in said feed in a proportion sufficient to absorb exothermic heat of reaction so as to maintain the temperature in said zone within the range between about 650° and 820° F. and to modify the product distribution of said chlorinated hydrocarbons, and withdrawing an effluent rich in 1,1-dichloroethane from said reaction zone.

13. A non-catalytic process for making 1,1-dichloroethane which comprises
 passing a feed mixture consisting essentially of ethane, chlorine and ethyl chloride through a reaction zone maintained at a pressure between about 40 and 80 p.s.i.g. at a rate corresponding to a residence time of about 5 to 30 seconds at reaction temperature, said feed mixture being characterized (1) by a mole ratio of free chlorine to ethane of between about 0.7 and 0.9 and by a mole ratio of ethyl chloride to free chlorine of between about 1.2 and 1.5, and (2) by a proportion of chlorinated ethane sufficient to maintain in said zone a reaction temperature within the range between about 700° and 800° F.,
 withdrawing the resulting product mixture from said reaction zone,
 separating an ethyl chloride fraction and a 1,1-dichloroethane fraction from the withdrawn product mixture, recycling said ethyl chloride fraction to said reaction zone, and recovering said 1,1-dichloroethane fraction.

References Cited by the Examiner

UNITED STATES PATENTS

| | | | |
|---|---|---|---|
| 2,628,259 | 2/1953 | Dirstine et al. | 260—656 |
| 2,838,577 | 6/1958 | Cook et al. | 260—656 |
| 2,838,579 | 6/1958 | Conrad et al. | 260—662 |
| 2,896,000 | 7/1959 | Miller et al. | 260—656 |

BERNARD HELFIN, *Primary Examiner.*

LEON ZITVER, *Examiner.*

K. V. ROCKEY, *Assistant Examiner.*